US005954225A

United States Patent [19]

Powe

[11] Patent Number: 5,954,225

[45] Date of Patent: Sep. 21, 1999

[54] PILL DISPENSER

[76] Inventor: Patricia S. Powe, 3250 Dauphin St., Apt. A-11, Mobile, Ala. 36606

[21] Appl. No.: 09/048,971

[22] Filed: Mar. 26, 1998

[51] Int. Cl.$^{6}$ ........................... G07F 59/00; B65G 59/00

[52] U.S. Cl. ............................. 221/2; 221/199; 206/534; 206/459.1

[58] Field of Search ........................ 221/2, 199; 206/534, 206/459.1

[56] References Cited

U.S. PATENT DOCUMENTS

| | | | |
|---|---|---|---|
| 3,126,129 | 3/1964 | Weinberg | 206/534 |
| 3,638,603 | 2/1972 | Conover | 206/534 |
| 3,762,601 | 10/1973 | McLaughlin | 221/2 |
| 4,275,384 | 6/1981 | Hicks et al. | 221/2 |
| 4,526,474 | 7/1985 | Simon | 206/534 |
| 5,020,037 | 5/1991 | Raven | 368/10 |
| 5,181,189 | 1/1993 | Hafner | 221/2 |
| 5,200,891 | 4/1993 | Kehr et al. | 221/2 |
| 5,233,571 | 8/1993 | Wirtschafter | 368/10 |
| 5,239,491 | 8/1993 | Mucciacciam | 364/569 |
| 5,313,439 | 5/1994 | Albeck | 368/10 |
| 5,583,832 | 12/1996 | DePonty | 368/10 |
| 5,646,912 | 7/1997 | Cousin | 221/2 |
| 5,838,224 | 11/1998 | Andrews | 221/2 |
| 5,850,937 | 12/1998 | Rauche | 221/2 |

*Primary Examiner*—William E. Terrell
*Assistant Examiner*—Joe Dillon, Jr.
*Attorney, Agent, or Firm*—Joseph N. Breaux

[57] ABSTRACT

A pill dispenser that includes a number of pill compartments each including a pivoting lid, a compartment identification diode, a compartment program select button, and a compartment alarm silence button. Each compartment alarm silence button is positioned within the pill compartment with which it corresponds. A computer board generate a number of alarm events that each include lighting one of the compartment identification diodes, and continuously outputting a signal to the speaker until the compartment alarm silence button within the pill compartment corresponding to the compartment identification diode is depressed.

2 Claims, 2 Drawing Sheets

PILL DISPENSER

TECHNICAL FIELD

The present invention relates to dispensing devices and more particularly to a pill dispenser including a computer board and a housing having seven pill compartments each including a pivoting lid, seven compartment identification diodes, seven compartment program select buttons, seven compartment alarm silence buttons, an alarm speaker grate, a clock set button, a two-position alarm set switch, a microphone grate, a two-position message record and hold switch, a time display, and a two-position alarm on/off switch; the computer board being positioned within the housing and in electrical connection with the seven compartment identification diodes, the seven compartment momentary contact program select buttons, the seven momentary contact compartment alarm silence buttons, the alarm speaker, the momentary contact clock set button, the two-position alarm set switch, the microphone, the two-position message record and hold switch, the time display, and the two-position alarm on/off switch; each of the seven pill compartments has a corresponding compartment identification diode, compartment program select but-on and compartment alarm silence button; each compartment alarm silence button is positioned within the pill compartment with which it corresponds; the computer board generating seven alarm events that each include lighting one of the seven compartment identification diodes, and continuously outputting a signal to the speaker until the compartment alarm silence button within the pill compartment corresponding to the compartment identification diode is depressed.

BACKGROUND ART

Because many medications are most effective when administered in the prescribed regime, it would be a benefit to many individuals to take medications at the prescribed times. Because it can be difficult for many individuals to remember to take medications at the prescribed times, it would be a benefit to have a device for reminding individuals to take medications at a number of predetermined times. Because individuals on a large number of medications can become confused as to which medication is required at a given time, it would be desirable to have a device that included a reminding mechanism that included a number of pill compartments within which the desired medications could be placed to eliminate the necessity for the individual to retrieve the medication bottles each time a dose was required. In addition to ensure that the right dose is taken, it would be a further benefit if each pill compartment included a visual indicator that corresponds to the particular pill compartment that was activated when the alarm event for that pill compartment was activated. In addition, to further insure that the individual had opened the right pill compartment in response to a particular alarm, it would be a still further benefit to have an alarm acknowledge button within the pill compartment to ensure the individual had opened the right pill compartment in response to the alarm.

GENERAL SUMMARY DISCUSSION OF INVENTORY

It is thus an object of the invention to provide a pill dispenser that includes an alarm mechanism for reminding individuals to take medications at a number of predetermined times.

It is a further object of the invention to provide a pill dispenser that includes a number of pill compartments within which the desired medications can be placed.

It is a still further object of the invention to provide a pill dispenser that includes a visual indicator that corresponds to the particular pill compartment that is activated when the alarm event for that pill compartment is activated.

It is a still further object of the invention to provide a pill dispenser that includes an alarm acknowledge button within each pill compartment to ensure the individual had opened the right pill compartment in response to a particular alarm.

It is a still further object of the invention to provide a pill dispenser that includes a computer board and a housing having seven pill compartments each including a pivoting lid, seven compartment identification diodes, seven compartment program select buttons, seven compartment alarm silence buttons, an alarm speaker grate, a clock set button, a two-position alarm set switch, a microphone grate, a two-position message record and hold switch, a time display, and a two-position alarm on/off switch; the computer board being positioned within the housing and in electrical connection with the seven compartment identification diodes, the seven compartment momentary contact program select buttons, the seven momentary contact compartment alarm silence buttons, the alarm speaker, the momentary contact clock set button, the two-position alarm set switch, the microphone, the two-position message record and hold switch, the time display, and the two-position alarm on/off switch; each of the seven pill compartments has a corresponding compartment identification diode, compartment program select button and compartment alarm silence button; each compartment alarm silence button is positioned within the pill compartment with which it corresponds; the computer board generating seven alarm events that each include lighting one of the seven compartment identification diodes, and continuously outputting a signal to the speaker until the compartment alarm silence button within the pill compartment corresponding to the compartment identification diode is depressed.

It is a still further object of the invention to provide a pill dispenser that accomplishes some or all of the above objects in combination.

Accordingly, a pill dispenser is provided. The pill dispenser includes a computer board and a housing having seven pill compartments each including a pivoting lid, seven compartment identification diodes, seven compartment program select buttons, seven compartment alarm silence buttons, an alarm speaker grate, a clock set button, a two-position alarm set switch, a microphone grate, a two-position message record and hold switch, a time display, and a two-position alarm on/off switch; the computer board being positioned within the housing and in electrical connection with the seven compartment identification diodes, the seven compartment momentary contact program select buttons, the seven momentary contact compartment alarm silence buttons, the alarm speaker, the momentary contact clock set button, the two-position alarm set switch, the microphone, the two-position message record and hold switch, the time display, and the two-position alarm on/off switch; each of the seven pill compartments has a corresponding compartment identification diode, compartment program select button and compartment alarm silence button; each compartment alarm silence button is positioned within the pill compartment with which it corresponds; the computer board generating seven alarm events that each include lighting one of the seven compartment identification diodes, and continuously outputting a signal to the speaker until the compartment alarm silence button within the pill compartment corresponding to the compartment identification diode is depressed.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
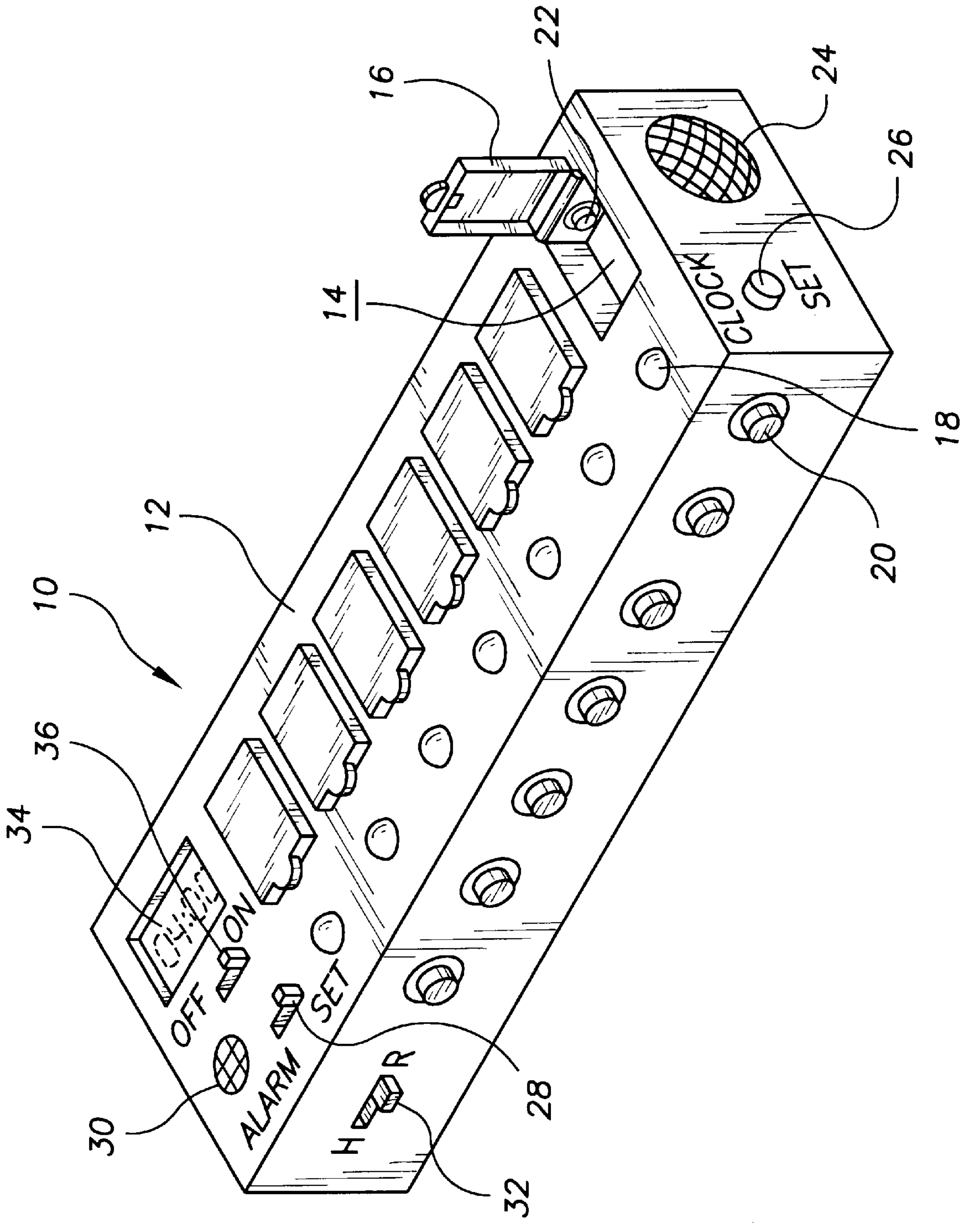
FIG. 1 is a perspective view of an exemplary embodiment of the pill dispenser of the present invention showing the seven pill compartments each including a pivoting lid, the seven compartment identification diodes, the seven compartment program select buttons, one of the seven compartment alarm silence buttons, the alarm speaker grate, the clock set button, the two-position alarm set switch, the microphone grate, the two-position message record and hold switch, the time display, and the two-position alarm on/off switch.

FIG. 1 shows an exemplary embodiment of the pill dispenser of the present invention, generally designated by the numeral 10. Pill dispenser 10 includes a molded plastic housing 12 having seven, identical rectangular shaped pill compartments 14 formed therein, each pill compartment being coverable by a pivoting lid 16, and including a corresponding compartment identification diode 18, a compartment program select button 20, and a compartment alarm silence button 22. Silence button 22 is mechanically separate from the corresponding pivoting lid 16 such that compartment alarm silence button 22 is not activated by positioning and movement of the corresponding pivoting lid 16. Housing 12 is also provided with an alarm speaker grate 24, a clock set button 26, a two-position alarm set switch 28, a microphone grate 30, a two-position message record and hold switch 32, an LCD time display 34, and a two-position alarm on/off switch 36. With reference to now FIG. 2, pill dispenser 10 also includes a computer board 40, a microphone 42, and an alarm speaker 44.

Computer board 40 is a conventional microprocessor based computer board having digital memory storage capacity, an analog to digital converter for converting the output of microphone 42 into a storable form and a digital to analog converter for converting the stored digital microphone output signal and converting it into an analog signal for driving alarm speaker 44. In this embodiment, conventional computer board 40 is configured to receive and store seven separate audio messages, one for playback with each of the alarm events.

Referring back to FIG. 1, each alarm event is keyed to a particular pill compartment 14. The audio message for each alarm event is recorded by placing two-position message record and hold switch 32 in the record position while two-position alarm set switch 28 is in the alarm position, and then depressing and holding the compartment program select button 20 corresponding to the desired alarm event while speaking into microphone 42. The alarm time for each alarm event is set by placing two-position message record and hold switch 32 in the hold position and two-position alarm set switch 28 in the set position, and then depressing and holding the desired compartment program select button 20 while using the clock set button 26 to set the desired alarm event time.

Figure 2:
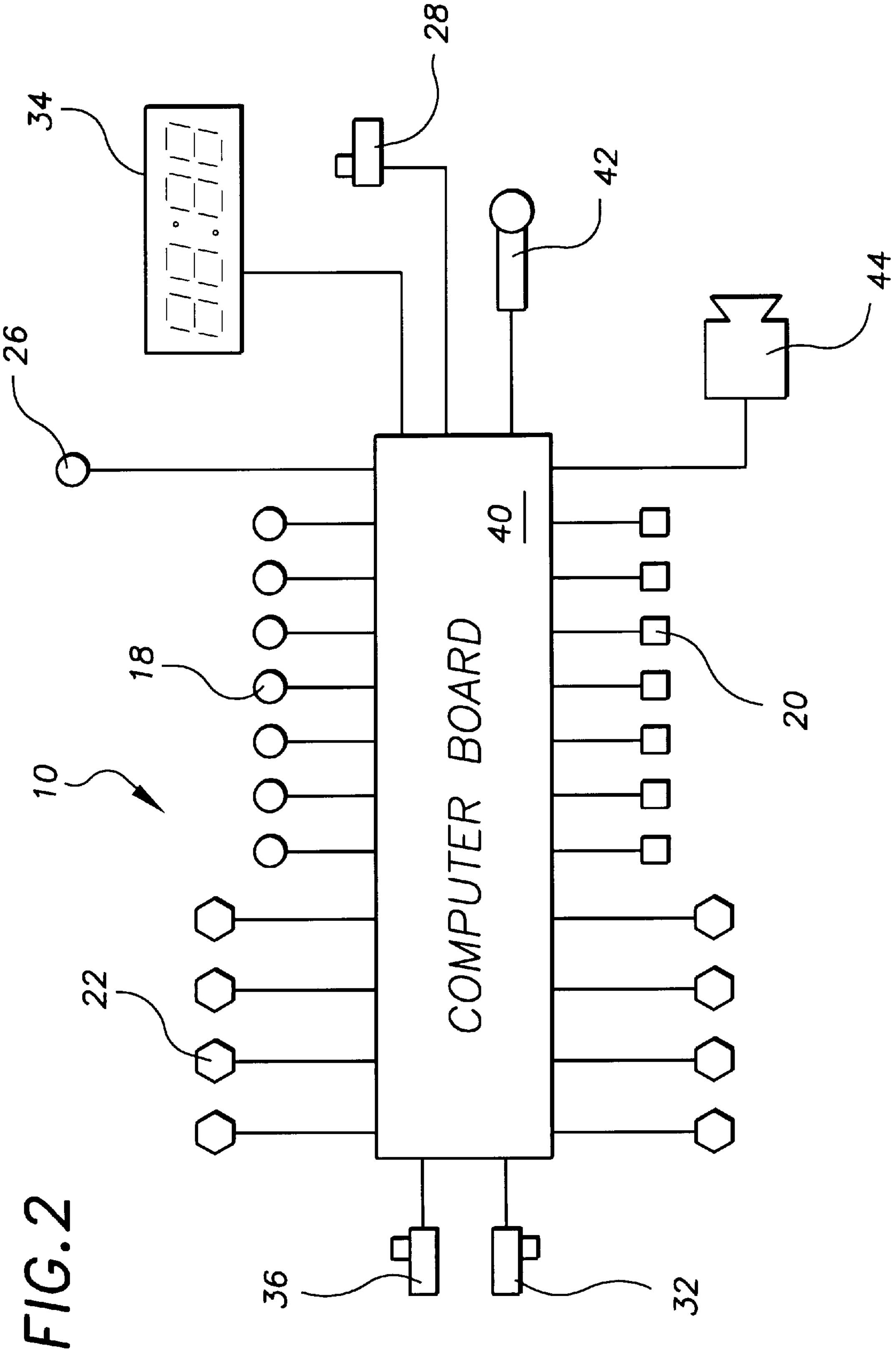
FIG. 2 is a schematic diagram of the interconnection between a computer board and the seven compartment identification diodes, the seven compartment momentary contact program select buttons, the seven momentary contact compartment alarm silence buttons, the alarm speaker, the momentary contact clock set button, the two-position alarm set switch, the microphone, the two-position message record and hold switch, the time display, and the two-position alarm on/off switch.

With general reference to FIGS. 1 and 2, in use, the user places the desired medications in the pill compartments 14 and closes each respective lid 16. When an alarm event occurs, computer board 40 retrieves the stored message for the particular alarm event and generates the require drive signal for alarm speaker 44 while lighting the compartment identification diode 18 corresponding to the designated pill compartment 14 for that alarm event. To insure the individual removes the medication from the correct pill compartment 14, the alarm event can only be reset by depressing the corresponding compartment alarm silence button 22 located within the pill compartment 40.

It can be seen from the preceding description that a pill dispenser has been provided that includes an alarm mechanism for reminding individuals to take medications at a number of predetermined times; that includes a number of pill compartments within which the desired medications can be placed; that includes a visual indicator that corresponds to the particular pill compartment that is activated when the alarm event for that pill compartment is activated; that includes an alarm acknowledge button within each pill compartment to ensure the individual had opened the right pill compartment in response to a particular alarm; and that includes a computer board and a housing having seven pill compartments each including a pivoting lid, seven compartment identification diodes, seven compartment program select buttons, seven compartment alarm silence buttons, an alarm speaker grate, a clock set button, a two-position alarm set switch, a microphone grate, a two-position message record and hold switch, a time display, and a two-position alarm on/off switch; the computer board being positioned within the housing and in electrical connection with the seven compartment identification diodes, the seven compartment momentary contact program select buttons, the seven momentary contact compartment alarm silence buttons, the alarm speaker, the momentary contact clock set button, the two-position alarm set switch, the microphone, the two-position message record and hold switch, the time display, and the two-position alarm on/off switch; each of the seven pill compartments has a corresponding compartment identification diode, compartment program select button and compartment alarm silence button; each compartment alarm silence button is positioned within the pill compartment with which it corresponds; the computer board generating seven alarm events that each include lighting one of the seven compartment identification diodes, and continuously outputting a signal to the speaker until the compartment alarm silence button within the pill compartment corresponding to the compartment identification diode is depressed.

It is noted that the embodiment of the pill dispenser described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pill dispenser comprising:

a computer board;

an alarm speaker; and a housing having a plurality of pill compartments, an alarm speaker grate, a clock set button, an alarm set switch, a time display, and an alarm on/off switch, each of said plurality of pill compartments having a corresponding pivoting lid closure, a compartment identification diode, a compartment program select button, and a compartment alarm silence button;

said computer board being positioned within said housing and in electrical connection with said alarm speaker, said clock set button, said alarm set switch, said time display, said alarm on/off switch, and each of said compartment identification diodes, said compartment momentary contact program select buttons and said momentary contact compartment alarm silence buttons to form a clock and an alarm;

said clock comprising said clock set button, and said time display;

said alarm comprising said alarm speaker, said alarm set switch, said alarm on/off switch, said compartment identification diodes, said compartment momentary contact program select buttons and said momentary contact compartment alarm silence buttons;

each of said compartment alarm silence buttons being positioned within a one of said plurality of pill compartments with which it corresponds and mechanically separate from the corresponding lid closure such that said compartment alarm silence button is not activated by positioning and movement of the corresponding pivoting lid closure;

said computer board generating a plurality of alarm events equal to the number of said plurality of pill compartments, each of said plurality of alarm events each including lighting one of said compartment identification diodes, and continuously outputting a signal to said alarm speaker until said compartment alarm silence button located within said pill compartment corresponding to said lighted compartment identification diode is depressed.

2. The pill dispenser of claim 1, further including:

a microphone;

said housing further includes: a microphone grate, and a message record and hold switch; and said computer board is in electrical connection with said microphone and said message record and hold switch.

* * * * *